United States Patent
De Napoli Ferreira et al.

(10) Patent No.: US 10,033,776 B2
(45) Date of Patent: Jul. 24, 2018

(54) METHODS AND SYSTEMS FOR ACCESSING RELEVANT CONTENT

(71) Applicant: Facebook, Inc., Menlo Park, CA (US)

(72) Inventors: Guilherme Carlos De Napoli Ferreira, San Francisco, CA (US); Christopher Wayne Masterson, San Francisco, CA (US); Scott Andrew Thomson, San Francisco, CA (US); Jon Yee Chiang, San Carlos, CA (US)

(73) Assignee: FACEBOOK, INC., Menlo Park, CA (US)

( * ) Notice: Subject to any disclaimer, the term of this patent is extended or adjusted under 35 U.S.C. 154(b) by 326 days.

(21) Appl. No.: 14/580,058

(22) Filed: Dec. 22, 2014

(65) Prior Publication Data
US 2016/0179808 A1    Jun. 23, 2016

(51) Int. Cl.
*G06F 17/30* (2006.01)
*H04L 29/06* (2006.01)
*H04L 12/58* (2006.01)

(52) U.S. Cl.
CPC ........ *H04L 65/403* (2013.01); *G06F 17/3089* (2013.01); *H04L 51/32* (2013.01)

(58) Field of Classification Search
USPC ........................................................ 707/725
See application file for complete search history.

(56) References Cited

U.S. PATENT DOCUMENTS

| | | | |
|---|---|---|---|
| 6,252,597 B1 * | 6/2001 | Lokuge | G06F 3/0481 715/841 |
| 9,129,027 B1 * | 9/2015 | Hamedi | G06F 17/30867 |
| 9,715,493 B2 * | 7/2017 | Papadopoullos | G06F 17/2785 |
| 2004/0133342 A1 * | 7/2004 | Banker | G06F 17/3089 701/532 |
| 2010/0114908 A1 * | 5/2010 | Chand | G06F 17/30637 707/748 |
| 2011/0289011 A1 * | 11/2011 | Hull | G06Q 10/107 705/319 |
| 2012/0023390 A1 * | 1/2012 | Howes | G06F 17/30864 715/205 |
| 2012/0158720 A1 * | 6/2012 | Luan | G06F 17/30867 707/732 |
| 2012/0166433 A1 * | 6/2012 | Tseng | H04W 4/21 707/728 |
| 2012/0166530 A1 * | 6/2012 | Tseng | G06Q 30/0255 709/204 |
| 2013/0224718 A1 * | 8/2013 | Woodward | G09B 7/00 434/350 |

(Continued)

*Primary Examiner* — Cam-Linh Nguyen
(74) *Attorney, Agent, or Firm* — Morgan, Lewis & Bockius LLP

(57) ABSTRACT

A server system receives a first request for access to content items from a user device associated with a user. In response to the first request, links to a plurality of content categories are sent for display on the user device. The content categories include a plurality of content items. Furthermore, a first group of content items determined to be relevant to the user is identified in accordance with one or more relevance criteria. The first group of content items includes a first subset of the plurality of content items. In response to the first request, links to the first group of content items are sent for display on the user device in addition to the plurality of content categories.

20 Claims, 12 Drawing Sheets

(56) References Cited

U.S. PATENT DOCUMENTS

| | | | |
|---|---|---|---|
| 2014/0006930 A1* | 1/2014 | Hollis | G06F 17/2247 715/234 |
| 2014/0180798 A1* | 6/2014 | Bailey | G06Q 30/0277 705/14.45 |
| 2015/0058324 A1* | 2/2015 | Kauwe | G06Q 50/01 707/722 |
| 2016/0299980 A1* | 10/2016 | Saini | G06Q 10/10 |

* cited by examiner

Identify a first group of content items determined to be relevant to the user in accordance with one or more relevance criteria, wherein the first group of content items includes a first subset of the plurality of content items ~510 (continued)

(A)

Determine, for a respective content item of the plurality of content items, a respective relevance based on one or more relevance criteria including at least one of a temporal proximity of the respective content item to the first request, a role of the user with respect to the respective content item, and an interaction frequency of the user with the respective content item. ~522

Determine a respective relevance score, which includes determining at least one of: ~524

A temporal score based on the temporal proximity of the respective content item to the first request ~526

A role score based on the role of the user with respect to the respective content item ~528

An interaction score based on the interaction frequency of the user with respect to the respective content item ~530

Each content item of the first subset of the plurality of content items has a respective relevance score satisfying a relevance threshold ~532

Order the first group of content items based on the respective relevance scores of the first subset of the plurality of content items ~534

METHODS AND SYSTEMS FOR ACCESSING RELEVANT CONTENT

TECHNICAL FIELD

This relates generally to social networking, including but not limited to identifying content relevant to a user in a social network.

BACKGROUND

Social networks provide a broad communication platform through which users can both publish and consume a variety of digital content and communicate with other users of the social network.

Given the vast amount of content managed in a social network and provided to users, however, users are often faced with the challenge of finding relevant content while filtering out irrelevant content.

SUMMARY

Accordingly, there is a need for devices with methods, systems, and interfaces for accessing content determined to be relevant to a user. By identifying relevant content using one or more relevance criteria, users are able to more efficiently and effectively access and process content provided by a social network. Such methods, systems, and interfaces optionally complement or replace conventional methods for accessing relevant content.

In accordance with some embodiments, a method is performed at a server system with one or more processors and memory storing instructions for execution by the one or more processors. The method includes receiving a first request for access to content items from a user device associated with a user. In response to the first request, links to a plurality of content categories are sent for display on the user device, where the content categories include a plurality of content items. A first group of content items determined to be relevant to the user is identified in accordance with one or more relevance criteria, where the first group of content items includes a first subset of the plurality of content items. Furthermore, in response to the first request, links to the first group of content items are sent for display on the user device in addition to the plurality of content categories.

In accordance with some embodiments, a server system (e.g., a social-network system) includes one or more processors, memory, and one or more programs; the one or more programs are stored in the memory and configured to be executed by the one or more processors. The one or more programs include instructions for performing the operations of the server-side method described above. In accordance with some embodiments, a computer-readable storage medium has stored therein instructions that, when executed by the server system, cause the server system to perform the operations of the server-side method described above. In accordance with some embodiments, a server system (e.g., a social-network system) includes means for performing the operations of the server-side method described above.

Thus, users are provided with faster, more efficient methods for accessing relevant content in a social network, thereby increasing the effectiveness, efficiency, and user satisfaction with social-networking systems.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

FIGS. 5A-5E are flow diagrams illustrating a method of accessing relevant content, in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first group could be termed a second group, and, similarly, a second group could be termed a first group, without departing from the scope of the various described embodiments. The first group and the second group are both groups, but they are not the same group.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
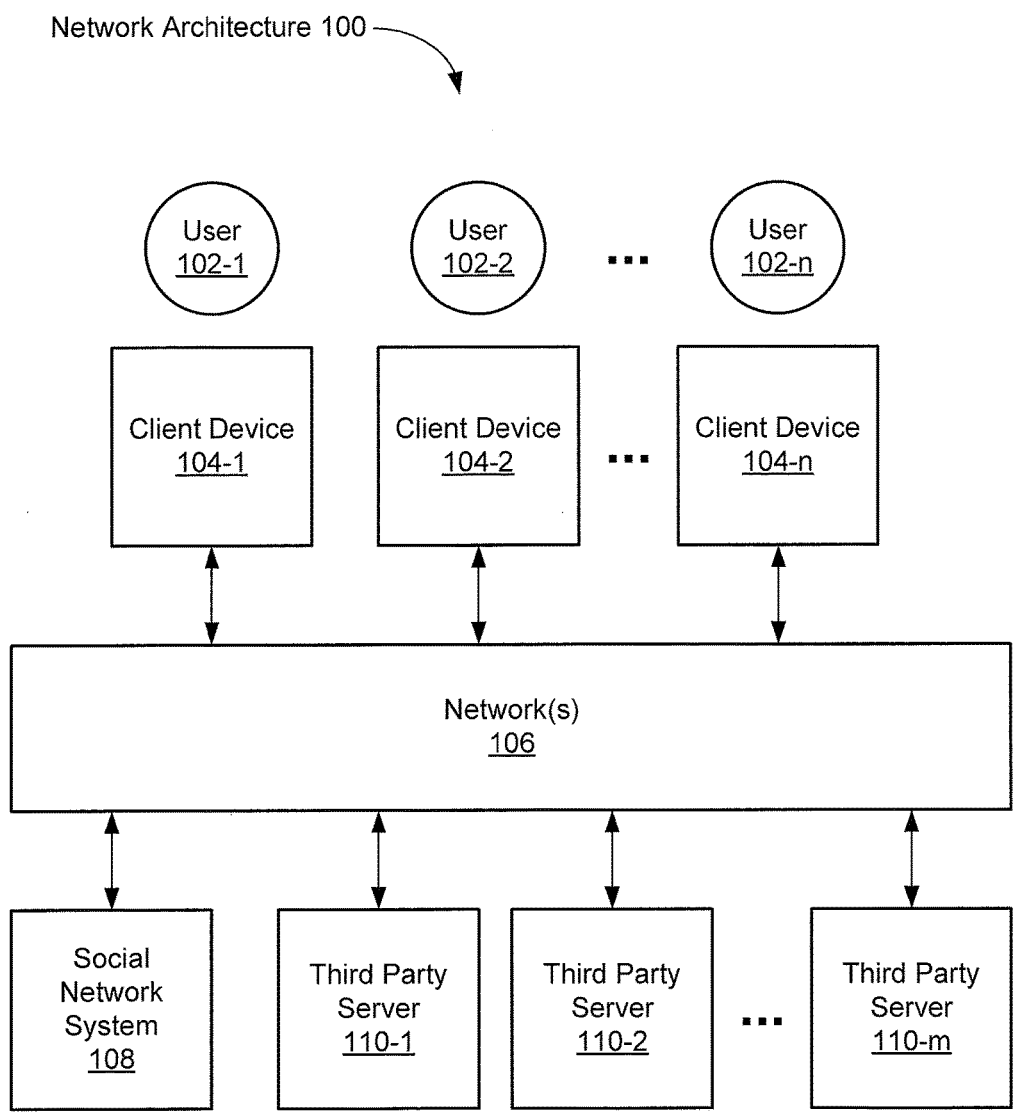
FIG. 1 is a block diagram illustrating an exemplary network architecture of a social network in accordance with some embodiments.

FIG. 1 is a block diagram illustrating an exemplary network architecture 100 of a social network in accordance with some embodiments. The network architecture 100 includes a number of client devices (also called "client systems," "client computers," or "clients") 104-1, 104-2, . . . 104-n communicably connected to an electronic social-network system 108 by one or more networks 106 (e.g., the Internet, cellular telephone networks, mobile data networks, other wide area networks, local area networks, metropolitan area networks, and so on). In some embodiments, the one or more networks 106 include a public communication network (e.g., the Internet and/or a cellular data network), a private communications network (e.g., a private LAN or leased lines), or a combination of such communication networks.

In some embodiments, the client devices 104-1, 104-2, . . . 104-n are computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to communicate with the social-network system 108. In some embodiments, the social-network system 108 is a single computing device such as a computer server, while in other embodiments, the social-network system 108 is implemented by multiple computing devices working together to perform the actions of a server system (e.g., cloud computing).

Users 102-1, 102-2, . . . 102-n employ the client devices 104-1, 104-2, . . . 104-n to access the social-network system 108 and to participate in a corresponding social-networking service provided by the social-network system 108. For example, one or more of the client devices 104-1, 104-2, . . . 104-n execute web browser applications that can be used to access the social-networking service. As another example, one or more of the client devices 104-1, 104-2, . . . 104-n execute software applications that are specific to the social-networking service (e.g., social-networking "apps" running on smart phones or tablets, such as a Facebook social-networking application running on an iPhone, Android, or Windows smart phone or tablet).

Users interacting with the client devices 104-1, 104-2, . . . 104-n can participate in the social-networking service provided by the social-network system 108 by providing and/or consuming (e.g., posting, writing, viewing, publishing, broadcasting, promoting, recommending, sharing) digital information, such as text comments (e.g., statuses, updates, announcements, replies, location "check-ins," private/group messages), photos, videos, audio files, links, documents, and/or other electronic content. In some embodiments, users interact with a page, group, event, message board, feed, application, and/or user profile of a social-networking service provided by the social network system 108. Users of the social-networking service can annotate information posted by other users of the social-networking service (e.g., endorsing or "liking" a posting of another user, or commenting on a posting by another user). In some embodiments, information can be posted on a user's behalf by systems and/or services external to the social-network system 108. For example, the user may post a review of a movie to a movie-review website, and with proper permissions that website may cross-post the review to the social network system 108 on the user's behalf. In another example, a software application executing on a mobile client device, with proper permissions, may use global positioning system (GPS) or other geo-location capabilities (e.g., Wi-Fi or hybrid positioning systems) to determine the user's location and update the social network system 108 with the user's location (e.g., "At Home", "At Work", or "In San Francisco, Calif."), and/or update the social network system 108 with information derived from and/or based on the user's location. Users interacting with the client devices 104-1, 104-2, . . . 104-n can also use the social-networking service provided by the social-network system 108 to define groups of users. Users interacting with the client devices 104-1, 104-2, . . . 104-n can also use the social-networking service provided by the social-network system 108 to communicate and collaborate with each other.

In some embodiments, the network architecture 100 also includes third-party servers 110-1, 110-2, . . . 110-m. In some embodiments, a given third-party server 110 is used to host third-party websites that provide web pages to client devices 104, either directly or in conjunction with the social-network system 108. In some embodiments, the social-network system 108 uses inline frames ("iframes") to nest independent websites within a user's social network session. In some embodiments, a given third-party server is used to host third-party applications that are used by client devices 104, either directly or in conjunction with the social-network system 108. In some embodiments, the social-network system 108 uses iframes to enable third-party developers to create applications that are hosted separately by a third-party server 110, but operate within a social-networking session of a user 102 and are accessed through the user's profile in the social-network system 108. Exemplary third-party applications include applications for books, business, communication, contests, education, entertainment, fashion, finance, food and drink, games, health and fitness, lifestyle, local information, movies, television, music and audio, news, photos, video, productivity, reference material, security, shopping, sports, travel, utilities, and the like. In some embodiments, a given third-party server 110 is used to host enterprise systems, which are used by client devices 104, either directly or in conjunction with the social-network system 108. In some embodiments, a given third-party server 110 is used to provide third-party content (e.g., news articles, reviews, message feeds, etc.).

In some embodiments, a given third-party server 110 is a single computing device, while in other embodiments, a given third-party server 110 is implemented by multiple computing devices working together to perform the actions of a server system (e.g., cloud computing).

Figure 2:
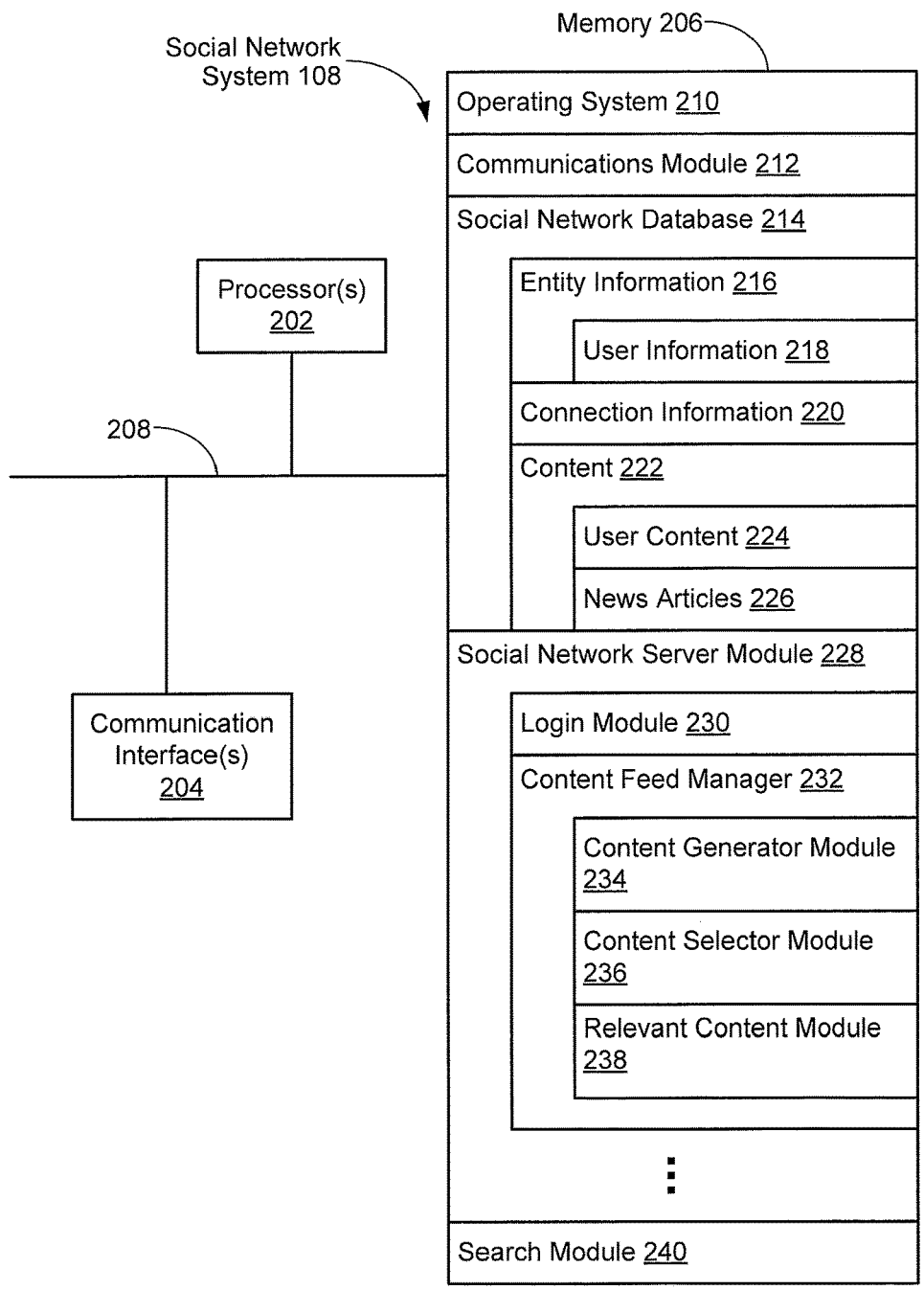
FIG. 2 is a block diagram illustrating an exemplary social-network system in accordance with some embodiments.

FIG. 2 is a block diagram illustrating an exemplary social-network system 108 in accordance with some embodiments. The social-network system 108 is a server system that typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The social-network system 108 optionally includes a user interface (not shown). The user interface, if provided, may include a display device and optionally includes inputs such as a keyboard, mouse, trackpad, and/or input buttons.

Alternatively or in addition, the display device includes a touch-sensitive surface, in which case the display is a touch-sensitive display.

Figure 3:
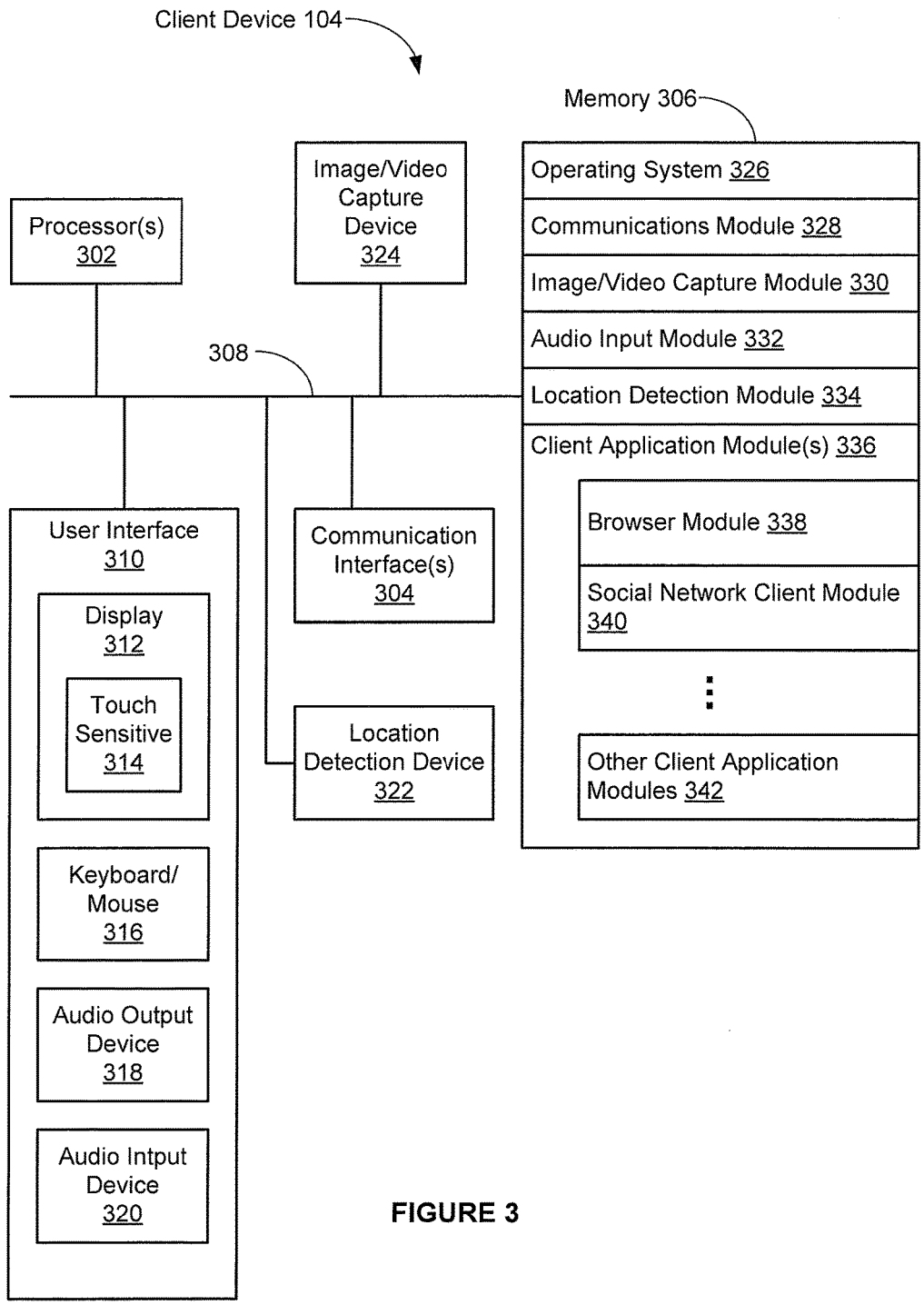
FIG. 3 is a block diagram illustrating an exemplary client device in accordance with some embodiments.

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the social-network system 108 to other computers via the one or more communication network interfaces 204 (wired or wireless) and one or more communication networks (e.g., the one or more networks 106)
- a social network database 214 for storing data associated with the social network, such as:
  - entity information 216, such as user information 218;
  - connection information 220; and
  - content 222, which includes:
    - user content 224, such as text comments (e.g., posts, statuses, updates, announcements, replies, location "check-ins," private/group messages), photos, videos, audio files, links, documents, and/or other digital electronic content; and/or
    - news articles 226;
- a social network server module 228 for providing social-networking services, social-media applications, and related features (e.g., in conjunction with browser module 338 or social network client module 340 on the client device 104, FIG. 3), which includes:
  - a login module 230 for logging a user 102 at a client 104 into the social-network system 108; and
  - a content feed manager 232 for providing content to be sent to clients 104 for display, which includes:
    - a content generator module 234 for describing objects in the social network database 214, such as images, videos, audio files, comments, status messages, links, applications, and/or other entity information 216, connection information 220, or content 222; and
    - a content selector module 236 for choosing the information/content to be sent to clients 104 for display; and
    - a relevant content module 238 for identifying content items determined to be relevant to a respective user 102; and
- a search module 240 for enabling users of the social-network system to search for content and other users in the social network.

The social network database 214 stores data associated with the social network in one or more types of databases, such as graph, dimensional, flat, hierarchical, network, object-oriented, relational, and/or XML databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social-networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, login information, privacy and other preferences, biographical data, and the like. In some embodiments, for a given user, the user information 218 includes the user's name, profile picture, contact information, birth date, sex, marital status, family status, employment, education background, preferences, interests, and/or other demographic information. Furthermore, in some embodiments, for a given user, the user information 218 includes the user's role with respect to a content item of content 222 (e.g., group administrator). In some embodiments, for a given user, the user information 218 includes statistics of the user with respect to the user's activity on a social network, such as the user's frequency of interaction with a content item (e.g., number of times and/or duration for which a social-media page is viewed).

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. In some embodiments, the resource is located in the social-network system 108 (e.g., in content 222) or on an external server, such as third-party server 110.

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social-network system 108 transmits a "friend request" to the second user. If the second user confirms the "friend request," the social-network system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like" or have "attended," "played," "listened," "cooked," "worked at," or "watched" the entity at the other node. The page in the social-networking service that corresponds to the entity at the other node may include, for example, a selectable "like," "check in," or "add to favorites" icon. After the user clicks one of these icons, the social-network system 108 may create a "like" edge, "check in" edge, or a "favorites" edge in response to the corresponding user action. As another example, the user may listen to a particular song using a particular application (e.g., an online music application). In this case, the social-network system 108 may create a "listened" edge and a "used" edge between the user node that corresponds to the user and the entity nodes that correspond to the song and the application, respectively, to indicate that the user listened to the song and used the application. In addition, the social-network system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 222 includes executable code (e.g., games executable within a browser window or frame), podcasts, links, and the like.

In some embodiments, the social network server module 228 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

In some embodiments, social network server module 228 provides and maintains content for social-media groups, pages, applications, and/or events.

In some embodiments, relevant content module 238 is configured to provide links to content categories 404 (e.g., FIG. 4C) and links to content items 406 (e.g., FIG. 4B) for display on user devices (e.g., client devices 104). In some embodiments, relevant content module 238 maintains relevance criteria (e.g., temporal proximity, user roles, interaction frequency, etc.), used for determining the relevance of content items (e.g., for determining relevance scores, including for example temporal proximity scores, role scores, and/or interaction scores) and for identifying groups of relevant content items. In some implementations, relevant content module 238 is also used for ordering groups of relevant content items based on determinations of relevance (e.g., based on relevance scores). Furthermore, in some implementations, relevant content module 238 adjusts relevance scores of content items based on user feedback (e.g., a gesture or other user input indicating user interest or a lack thereof in a content item). In some embodiments, relevant content module 238 is further configured to adjust the number of content items in a group of relevant content items based on an activity level of the user and/or a type of the user device.

FIG. 3 is a block diagram illustrating an exemplary client device 104 in accordance with some embodiments. The client device 104 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device includes inputs such as a keyboard, mouse, and/or other input buttons 316. Alternatively or in addition, in some embodiments, the display device 312 includes a touch-sensitive surface 314, in which case the display device 312 is a touch-sensitive display. In client systems that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104. The client device 104 also optionally includes an image/video capture device 324, such as a camera or webcam.

Memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 326 that includes procedures for handling various basic system services and for performing hardware dependent tasks;
- a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324, where the respective image or video may be sent or streamed (e.g., by a client application module 336) to the social-network system 108;
- an audio input module 332 (e.g., a microphone module) for processing audio captured by the audio input device 320, where the respective audio may be sent or streamed (e.g., by a client application module 336) to the social-network system 108;

a location detection module 334 (e.g., a GPS, Wi-Fi, or hybrid positioning module) for determining the location of the client device 104 (e.g., using the location detection device 322) and providing this location information for use in various applications (e.g., social network client module 340); and one or more client application modules 336, including the following modules (or sets of instructions), or a subset or superset thereof:

a web browser module 338 (e.g., Internet Explorer by Microsoft, Firefox by Mozilla, Safari by Apple, or Chrome by Google) for accessing, viewing, and interacting with web sites (e.g., a social-networking web site such as www.facebook.com);

a social network client module 340 for providing an interface to a social network (e.g., a social network provided by social-network system 108), social-media applications, and related features; and/or other optional client application modules 342, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Each of the above-identified modules and applications corresponds to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Attention is now directed towards embodiments of graphical user interfaces ("GUIs") and associated processes that may be implemented on a client device (e.g., the client device 104 in FIG. 3).

Figure 4A:
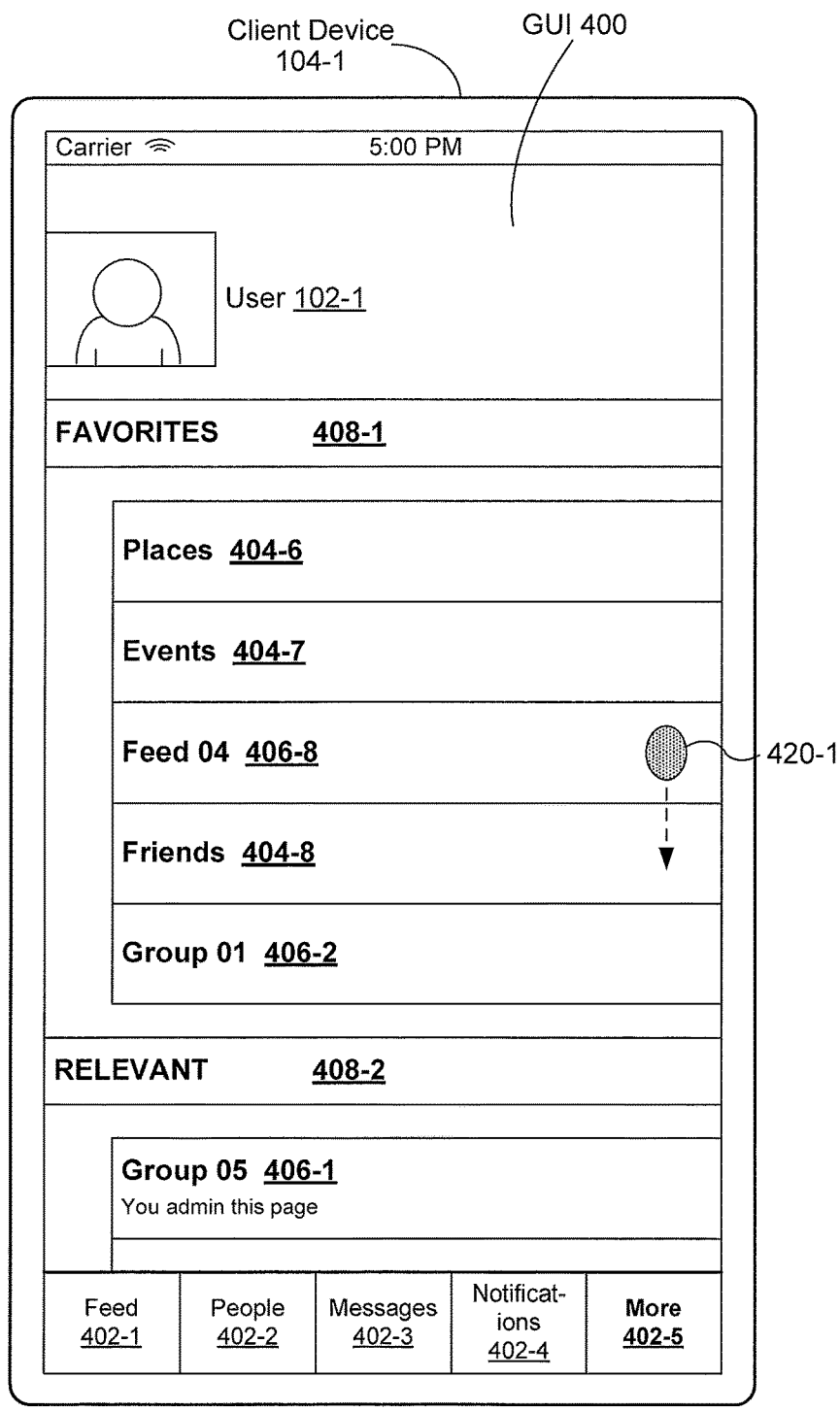
FIGS. 4A-4D illustrate exemplary user interfaces on a client device for accessing content, in accordance with some embodiments.
Figure 4B:
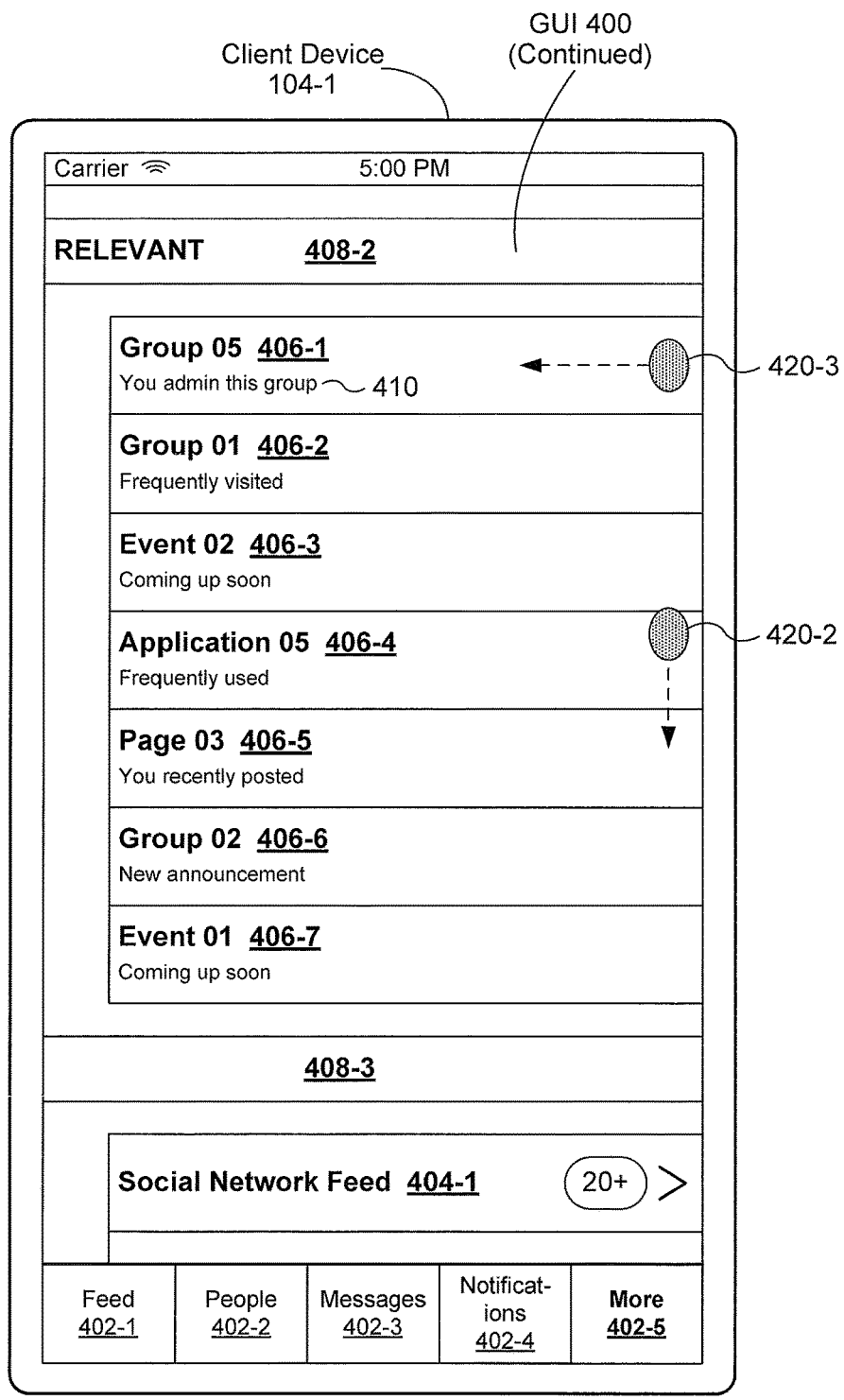
Figure 4C:
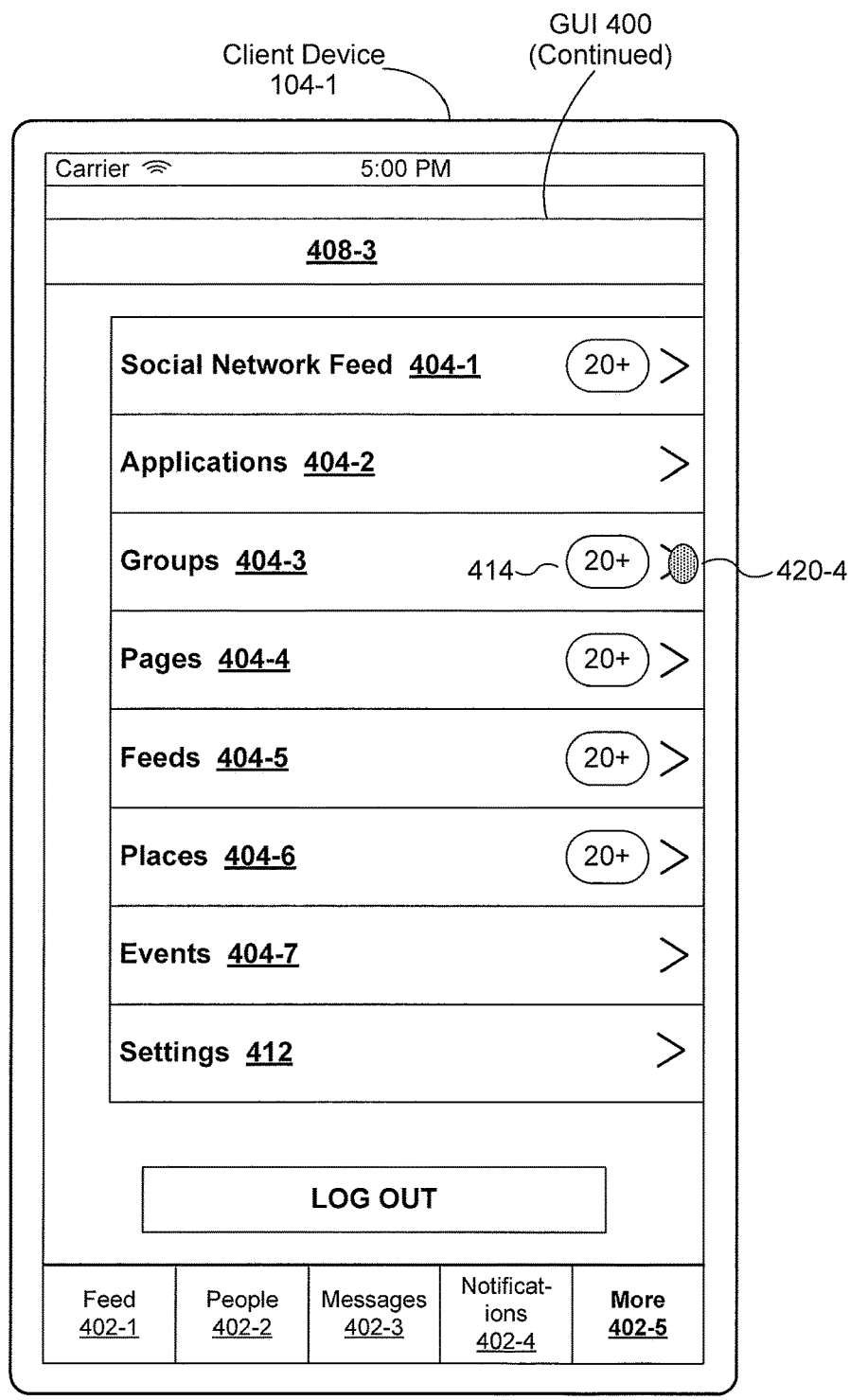

FIGS. 4A-4C illustrate an exemplary GUI 400, shown on a display of a client device 104, for accessing relevant content, in accordance with some embodiments. The GUI 400 illustrates the processes described below, including the method 500 (FIGS. 5A-5E). While FIGS. 4A-4C illustrate an example of a GUI, in other embodiments, a GUI displays user-interface elements (e.g., user-interface elements corresponding to content categories 404, content items 406, and/or other user-interface elements not shown) in an arrangement distinct from the embodiments of FIGS. 4A-4C. Furthermore, while FIGS. 4A-4C combine to show a single GUI 400 (i.e., the GUI illustrated in FIG. 4B is a continuation of the GUI illustrated in FIG. 4A, and the GUI illustrated in FIG. 4C is a continuation of the GUI illustrated in FIG. 4C), in other embodiments, GUI 400 is divided into separate GUIs (e.g., each having a separate screen that is separately accessed).

The GUI 400 is an example of a GUI of an application (e.g., web browser, social-networking application for a smart phone, etc.) for accessing a social network (e.g., provided by social network system 108). The GUI 400 is specific to the user of the client device 104 on which the GUI 400 is displayed (e.g., user 102-1 of client device 104-1). As described above, in this example, FIGS. 4A-4C represent a single GUI 400, which the user navigates using scroll inputs (e.g., touch input 420-1 and 420-2, FIGS. 4A and 4B).

The GUI 400 includes user-interface elements which provide access to other sections or features of the social network when selected. In this example, "Feed" button 402-1 allows a user to access a general feed of the social network, "People" button 402-2 allows a user to access a list of friends of the user, "Messages" button 402-3 allows a user to access private messages sent and received by the user, "Notifications" button 402-4 allows a user to access notifications (e.g., updates) regarding content on the social network, and "More" button 402-5 allows a user to access and view (among other things) content categories and content items. (Instead of physical buttons, the buttons 402-1 through 402-5 may be respective user-interface elements on a screen, such as a touch-sensitive screen.) Here, the GUI 400 is accessed by selecting "More" button 402-5.

As shown, the GUI 400 also includes selectable user-interface elements (e.g., links) corresponding to content categories 404 and to content items 406 of the content categories. The content categories 404 include "Social Network Feed" 404-1, "Applications" 404-2, "Groups" 404-3, "Pages" 404-4, "Feeds" 404-5, "Places" 404-6, and "Events" 404-7. The content items 406 include "Group 05" 406-1, "Group 01" 406-2, "Group 02" 406-6, "Event 01" 406-7, "Event 02" 406-3, "Application 05" 406-4, and "Page 03" 406-5.

Figure 4D:
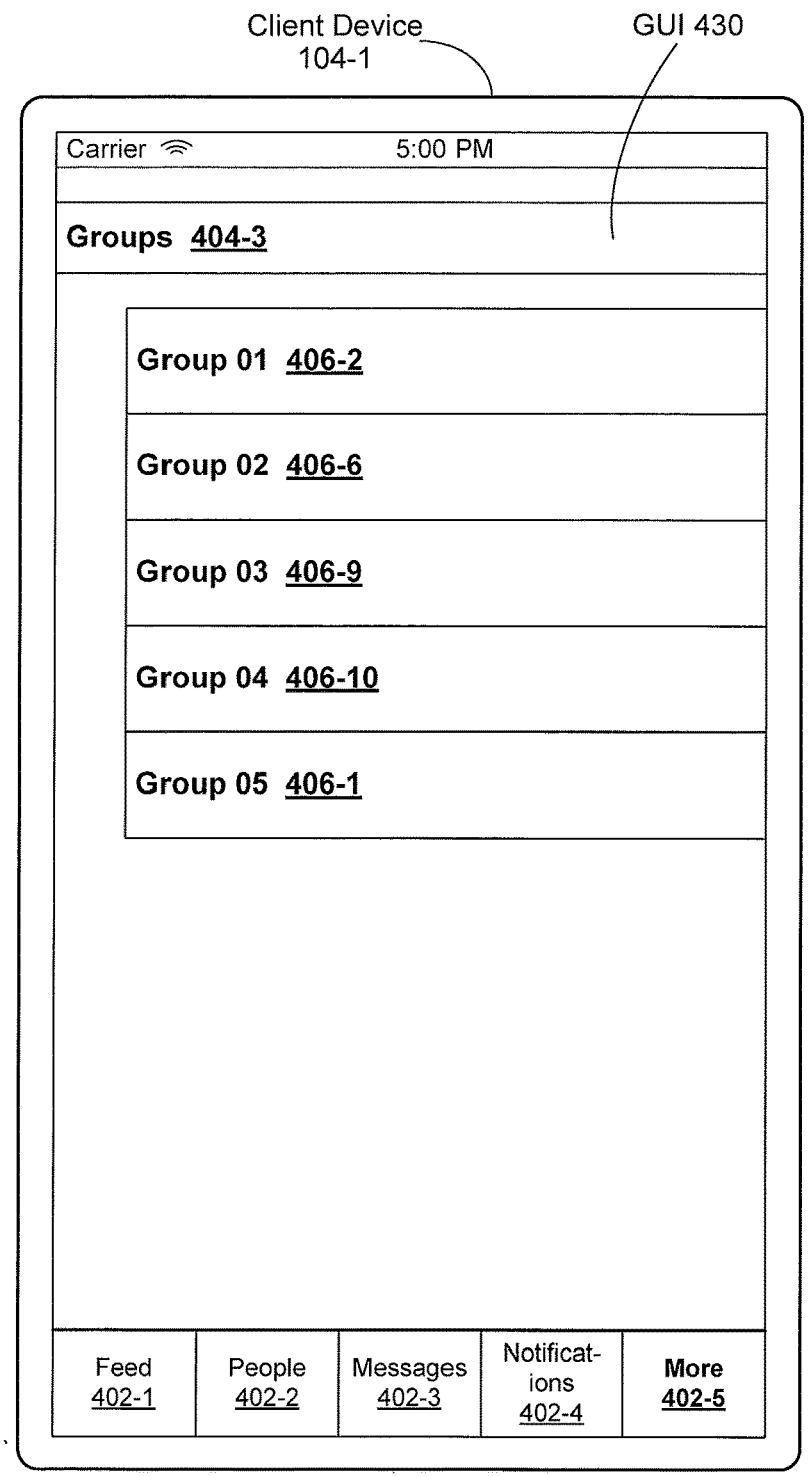

Content categories include respective types of content items with which users of a social-networking service can interact. For example, "Groups" content category 404-3 includes various social-media groups, formed by users of the social network, to which the user is subscribed (e.g., "Groups" content items correspond to a message board, group chat room, profile, etc. for a particular group of users). In some implementations, user-interface elements corresponding to content categories 404 are links, selection of which displays links to specific content items 406 in respective content categories. For example, selecting "Groups" content category 404-3 in FIG. 4C displays a GUI 430 with links to content items for groups "01" through "05" (i.e., groups 406-2, 406-6, 406-9, 406-10, and 406-1), as shown in FIG. 4D). In some implementations, user-interface elements corresponding to content items 406 are links, selection of which provides access to the corresponding content items (e.g., selecting "Page 03" content item 406-6 in FIG. 4B displays "Page 03"). Various content categories and content items are described in greater detail with respect to FIG. 5A-5E.

In the example shown, links to content categories 404 and content items 406 are also organized into sections 408 (e.g., "Favorites" section 408-1 in FIG. 4A, "Relevant" section 408-2 in FIGS. 4A-4B, and section 408-3 in FIGS. 4B-4C), which are displayed in distinct portions of the GUI 400.

"Favorites" section 408-1 (FIG. 4A) includes links to both content categories 404 (e.g., "Places" content category 404-6) and content items 406 (e.g., "Feed 04" content item 406-5). In some embodiments, "Favorites" section 408-1 (or any other designated or predefined section of a GUI not shown in FIGS. 4A-4C) includes content categories and content items chosen for display by a user of the client device. Alternatively and/or additionally, the content categories and content items displayed in "Favorites" section 408-1 are automatically chosen (e.g., by social network system 108).

"Relevant" section 408-2 (FIGS. 4A-4B) includes links to content items 406-1 through 406-7 determined to be relevant to the user (e.g., by the relevant content module 238, FIG. 2, of the social network system 108. In this example, each of content items 406-1 through 406-7 is associated with a content category that is displayed in sections 408-1 and/or 408-3 of the GUI 400. In some embodiments, however, one or more content items displayed in "Relevant" section 408-2 are not associated with any of the content categories displayed in sections 408-1 and/or 408-3 of the GUI 400. In some embodiments, the GUI 400 also displays an indication of the reason why a corresponding content item 406 is deemed relevant to the user (e.g., indicator 410, "You admin this page"). For example, "Group 01" content item 406-2 is relevant and included in "Relevant" section 408-2 because it is "Frequently visited."

A user may provide user feedback to adjust a relevance of a displayed content item 406. The user feedback may indicate interest or a lack of interest in a content item 406. For example, touch input 420-3 (FIG. 4B), which is a leftwards swipe gesture, indicates a lack of user interest in the "Group 05" content item 406-1. In some embodiments, the touch input 420-3 results in removal of the link to the "Group 05" content item 406-1 from the "Relevant" section 408-2.

Section 408-3 (FIGS. 4B-4C) includes links for multiple content categories 404 (e.g., content categories 404-1 through 404-6) and a link for accessing settings for the social-networking application (e.g., "Settings" user-interface element 412). In this particular example, the GUI 400 also indicates the number of new content items and/or updates for a particular content category (e.g., 414, indicating that more than 20 content items associated with "Groups" content category 404-3 have updates).

Selection of a displayed content category 404 (e.g., of a corresponding link from either "Favorites" section 408-1 or section 408-3) causes a list of associated content items 406 to be displayed. For example, "Group" content category 404-3 is selected in FIG. 4C (e.g., with touch input 420-4), which causes links to groups "01" through "05" (i.e., groups 406-2, 406-6, 406-9, 406-10, and 406-1) to be displayed in the GUI 430, as shown in FIG. 4D. The links in FIG. 4D may be selected to access the respective groups, which are examples of content items 406.

Therefore, as shown in FIGS. 4A-4C, the GUI 400 provides a number of alternative pathways for accessing the same content items. For example, user 102-1 of client device 104-1 may access a particular social-media group, such as "Group 01" content item 406-2, by selecting the content item from "Favorites" section 408-1 (FIG. 4A) or "Relevant" section 408-2 (FIG. 4B). Alternatively, the user may access "Group 01" by selecting "Groups" content category 404-3 (FIG. 4C) to display a list of content items corresponding to various social-media groups, which includes a link to "Group 01" content item 406-2. The "Relevant" section 408-2 allows content items 406 to be accessed in a single step, through a single link, as opposed to the two steps (and two corresponding links) for accessing a content item 406 through section 408-3.

FIGS. 5A-5E are flow diagrams illustrating a method 500 of accessing relevant content, in accordance with some embodiments. In some embodiments, the method 500 is performed by a server system (e.g., social network system 108, FIGS. 1-2) that sends information to a user device (e.g., client device 104, FIGS. 1 and 3) for display. FIGS. 5A-5E correspond to instructions stored in a computer memory or computer readable storage medium (e.g., memory 206 of the social network system 108, FIG. 2).

The server system (e.g., social network system 108) receives (502) a first request for access to content items from a user device associated with a user (e.g., client device 104-1, FIG. 4A). In some implementations, the first request includes the selection of a user-interface element, where the selection triggers display of a GUI that includes links to content categories 404 and content items 406 (e.g., selecting "More" button 402-5 in FIG. 4B displays the GUI 400, FIGS. 4A-4C). In some implementations, the first request results from launching or otherwise executing an application (e.g., social-networking application of client application modules 336, or any sub-modules thereof, FIG. 3). In some implementations, the first request is generated and sent to the server system in response to a user action (e.g., selecting a refresh button, performing a touch gesture, etc.) for updating or refreshing a GUI (e.g., GUI 400) of an application (e.g., social-networking application).

In response to the first request, the server sends (504) links to a plurality of content categories for display on the user device. The content categories include a plurality of content items. In some embodiments, content categories include (506) social-media groups, social-media pages, social-media events, social-media applications, and/or social-media feeds. Social-media groups include, for example, pages/spaces of a social-networking service where members of a group can communicate (e.g., message boards, group chat rooms, group profiles, etc.). Groups are formed by users of a social-networking service arbitrarily, by interest, or by any other characteristic shared by users of a group. Social-media pages include, for example, advertisements, profiles, walls, message boards, and/or web pages displaying content published by users or entities of a social-networking service. Social-media events include, for example, pages/spaces of a social-networking service created for organizing and/or notifying users of events (e.g., birthdays, birthday celebrations, parties, meetings, deadlines, anniversaries, etc.). Social-media applications include, for example, applications hosted by a social-networking service (e.g., social network system 108, FIG. 2), third-party servers (e.g., third-party servers 110, FIG. 1), and/or applications stored in a client device (e.g., client application modules 336), that operate with or within a social-networking service. Examples of such social-media applications are described with respect to FIGS. 1-3. Social-media feeds include, for example, lists, collections, streams, or other content provided to a client device for viewing and interacting (e.g., user posts, articles, advertisements).

In some embodiments, a content category includes at least some of the same content items as another content category, while in other embodiments, a content category includes content items distinct from the content items of other content categories. In some embodiments, all content items are associated with a particular content category. In other embodiments, however, some content items are not associated with a particular content category. Content categories are not limited to those shown in FIGS. 4A-4C and described herein, and sometimes include other types of content that are created, viewed, and/or presented to users of a social-networking service.

In some embodiments, sending (504) links to a plurality of content categories includes providing (508) the links to the plurality of content categories for display in a first section of a GUI shown on a display of the user device. For example, links to content categories 404-1 through 404-6, and nothing else, are provided for display in section 408-3

(FIGS. 4B-4C). In another example, "Favorites" section 408-1 (FIG. 4A) includes links to content categories 404 (e.g., "Places" content category 404-6, "Events" content category 404-7) as well as links to content items 406 (e.g., "Feed 04" content item 406-8, "Group 01" content item 406-2).

A first group of content items determined to be relevant to the user is identified (510) in accordance with one or more relevance criteria. The first group of content items includes a first subset of the plurality of content items in the content categories.

In some embodiments, identifying (510) a first group of relevant content items includes identifying (512) an upcoming event with an event time (e.g., start time, end time, specific date/time, specific range of dates/times, etc.) within a specified time period with respect to a time of the first request (e.g., events beginning within a specified number of hours, days, weeks, etc., from the time of the first request). As an example, referring to FIG. 4B, assume that "Event 02" content item 406-3 corresponds to an event having an associated event start time at 8:00 PM (on the day when the GUI 400 is viewed), that the specified time period for determining relevance is five hours, and that the first request to access content items 406 is received at 5:00 PM (the time at which the GUI 400 is viewed in this example, as shown at the top of the user interface). The group of relevant content items 406-1 through 406-7 includes "Event 02" content item 406-3, since "Event 02" content item 406-3 begins before 10:00 PM.

In some embodiments, identifying (510) a first group of relevant content items includes identifying (514) an upcoming event, of a plurality of upcoming events, with an event time closest to a time of the first request. In an example, a first event has a start time at 10:00 PM and a second event has a start time at 11:00 PM. If the first request is sent or received at 8:00 PM on the same day as the first and second events, a group of relevant content items includes at least (or only) the content item corresponding to the first event (10:00 PM start time), since it is closest to the time of the first request.

In some embodiments, identifying (510) a first group of relevant content items includes identifying (516) a social-media page that the user administers (e.g., for which the user has an administrator role and/or administrative privileges).

In some embodiments, the number of content items in the first group of content items is based on (518) an activity level of the user (e.g., time spent using the social-networking service), and/or a type of the user device. For example, in FIG. 4B, the group of relevant content items 406-1 through 406-7 includes additional content items if the user is an active user of the social-networking service (e.g., with an activity level that satisfies a threshold), and includes fewer content items if the user is a less active user of the social-networking service (e.g., with an activity level that does not satisfy the threshold). In some embodiments, the activity level of a user is based on the amount of time a user spends using the social-networking service (e.g., both mobile and non-mobile applications), and/or a social-networking application (e.g., only mobile applications, such as through a web browser, a social-networking application on a smart phone, etc.). In some embodiments, the activity level of a user is based on the frequency with which the user selects content items 406 in the "Relevant" section 408-2, FIGS. 4A-4B). In another example, with respect to a type of user device, the group of content items 406-1 through 406-7 includes more content items if the user accesses the social-networking service using a non-mobile device (e.g., PC computer) than if the user accesses the social-networking service using a mobile device (e.g., cellular phone).

In some embodiments, identifying (510) the first group of relevant content items includes identifying (520) a content item, of the plurality of content items, for which the user has satisfied (e.g., exceeded, or equaled or exceeded) a threshold number of interactions. Interactions with respect to a content item include, for example, instances in which a user has viewed or accessed the content item, or provided content in, for, or with respect to the content item (e.g., posting a message, commenting, providing user feedback, liking, etc.). In some embodiments, the threshold number of interactions is a total number of interactions measured over a predefined period of time (e.g., number of accesses within the past week or other period of time preceding the first request). Alternatively, the threshold number of interactions is an average number of interactions measured over a predefined period of time (e.g., average number of accesses per day). For example, referring to FIG. 4B, the group of content items 406-1 through 406-7 may include "Group 01" content item 406-2 because the user has viewed the page for "Group 01" six times in a given day, where the threshold is set at five.

Referring now to FIG. 5B, in some embodiments, identifying (510) a first group of relevant content items includes determining (522), for a respective content item of the plurality of content items, a respective relevance based on one or more relevance criteria. Relevance criteria include at least one of a temporal proximity of the respective content item to the first request, a role of the user with respect to the respective content item, and an interaction frequency of the user with the respective content item.

The temporal proximity of a content item to a request is measured as the difference in time between an event time (e.g., start time, end time, specific date/time, specific range of dates/times, etc.) and the time at which the first request is sent or received. The temporal proximity of a content item generally serves as a measure of how soon an event will occur. Related examples are provided above with respect to operations 512 and 514 (e.g., identifying an upcoming event with an event time within a specified time period, and identifying an upcoming event with an event time closest to a time of the first request).

The role of the user with respect to a content item is based on a user's privileges for administrating (e.g., social-media group/page administrator) and/or managing the content item (e.g., event creator, organizer, collaborator, etc.). For example, referring to FIG. 4B, "Group 05" content item 406-1 is determined to be relevant, and is included in the group of content items 406-1 through 406-7 displayed in "Relevant" section 408-2, because the user is an administrator of "Group 05" (as shown by indicator 410, "You admin this group").

The interaction frequency of the user with a content item is based on, for example, a number of interactions (total or average) with respect to the content item, and/or a duration for which a user interacts with the content item. As described above with respect to operation 520, in some embodiments, interactions with respect to a content item include instances in which a user has viewed or accessed the content item (e.g., accessing a social-media page), and/or provided content in, for, or with respect to the content item (e.g., posting a message, commenting, providing user feedback, liking, etc.). In some embodiments, determining a relevance of a content item includes determining whether a user has satisfied (e.g., exceeded, or equaled or exceeded) a threshold duration of interaction with respect to the content item. For example, referring to FIG. 4B, "Application 05" content item 406-4 is determined to be relevant, and is included in the group of content items 406-1 through 406-7 displayed in "Relevant" section 408-2, because the user has continuously accessed and used "Application 05" for an hour, where the threshold duration is set at 30 minutes of continuous usage.

In some embodiments, relevance criteria include how recent activity detected with respect to a content item (e.g., updates to an event, recent posts made to a group/page by the user or other users, etc.) is. For example, as shown in FIG. 4B, "Group 02" content item 406-6 is determined to be relevant, and is included in the group of content items 406-1 through 406-7 displayed in "Relevant" section 408-2, because an announcement has recently been made to the group (e.g., within a specified time period preceding the first request), as shown by the corresponding indicator stating "New announcement".

Furthermore, in some embodiments, determining (522) a respective relevance based on one or more relevance criteria includes determining (524) a respective relevance score. In some implementations, the relevance score of a content item indicates a degree of relevance of the content item (e.g., a high score indicates that a content item is particularly relevant to the user, while a low score indicates that a content item is less relevant to the user, or vice-versa). The relevance score is based on at least one of a temporal score (526) based on the temporal proximity of the content item to the request, a role score (528) based on the role of the user with respect to the content item (e.g., the degree of the user's privileges, such as whether the user is an administrator), or an interaction score (530) based on the interaction frequency of the user with respect to the content item.

In some implementations, the respective relevance score for a content item is a sum of a respective temporal score, role score, and/or interaction score of the content item. Furthermore, in some implementations, the respective relevance score for a content item is a weighted sum of a respective temporal score, role score, and interaction score of the content item, with the temporal score, role score, and interaction score having respective weights.

In some embodiments, each content item of the first subset of the plurality of content items has a respective relevance score satisfying (532) (e.g., exceeding, or equaling or exceeding) a relevance threshold. For example, content items 406-1 through 406-7 in FIG. 4B are displayed in "Relevant" section 408-2 because each has a respective relevance score satisfying a relevance threshold.

In some embodiments, the first group of content items is ordered (534) based on the respective relevance scores of the content items. In some embodiments, the first group of content items is displayed in order of decreasing relevance score (i.e., the content item with the highest relevance score is displayed at the top of "Relevant" section 408-2, while the content item with the lowest relevance score is displayed at the bottom of "Relevant" section 408-2, where a higher score indicates a higher relevance). For example, as shown in FIG. 4B, "Event 02" content item 406-3 is displayed at a higher position than "Event 01" content item 406-7 because the event start time of "Event 02" is sooner than that of "Event 01."

Figure 5A:
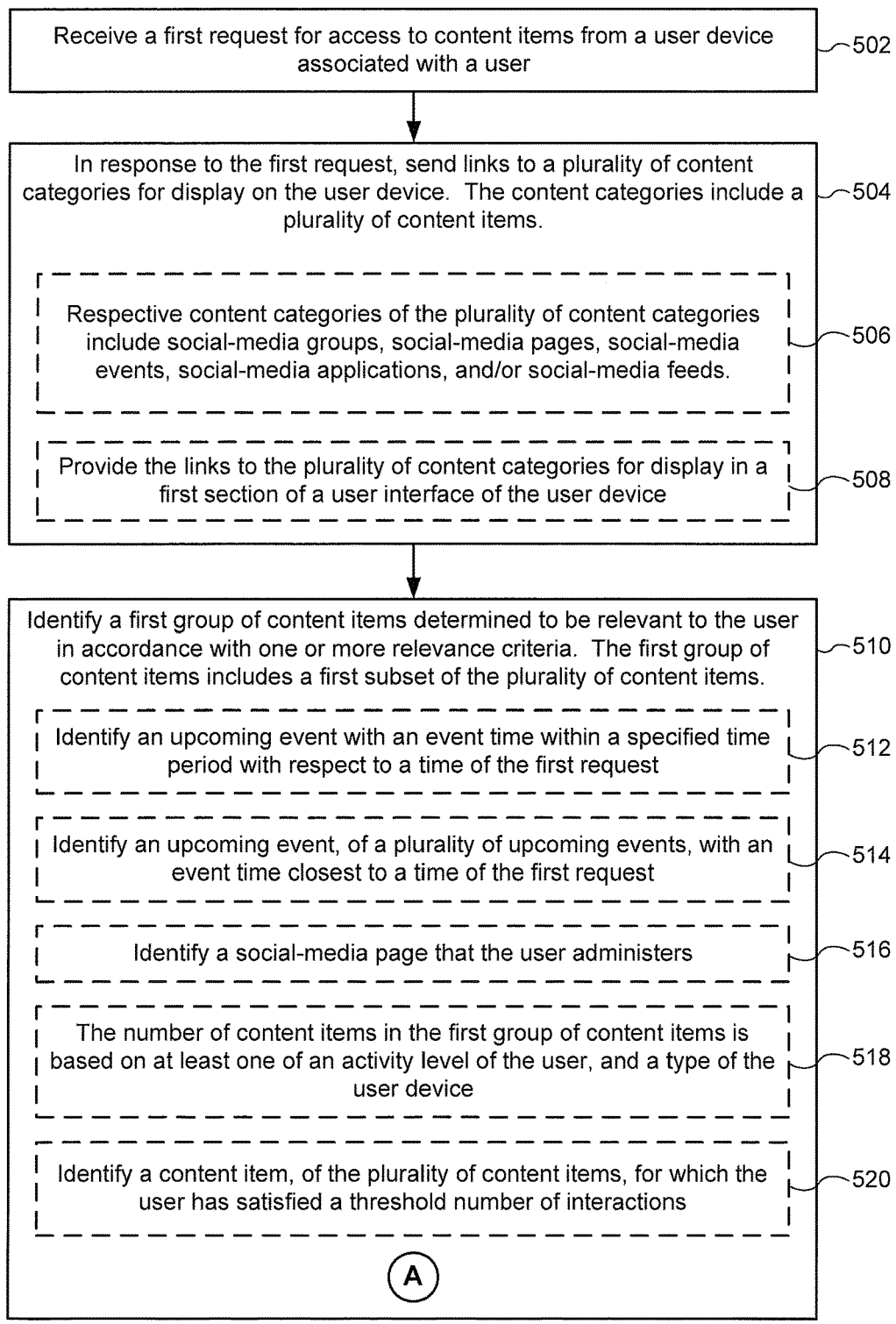
Figure 5C:
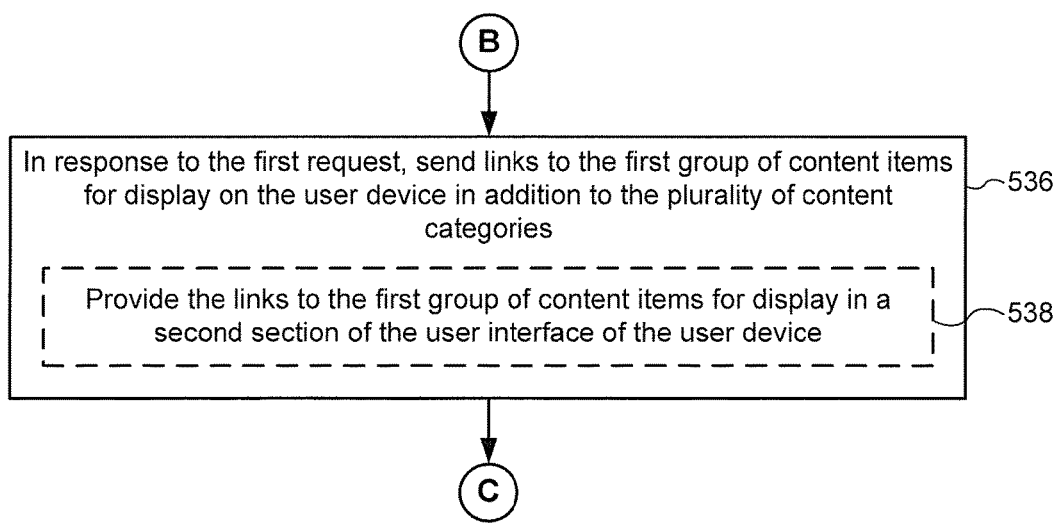

Referring now to FIG. 5C, in response to the first request (step 502), links to the first group of content items are sent (536) for display on the user device in addition to the plurality of content categories (e.g., as shown by the GUI 400, which includes links corresponding to content categories 404 and content items 406). Optionally, the links to the first group of content items are provided (538) for display in a second section of the GUI shown on the display of the user device (e.g., "Relevant" section 408-2 includes links to relevant content items 406-1 through 406-7, FIG. 4B). The second section is distinct from the first section that displays the links to the plurality of content categories.

In some embodiments, the relevance of a first content item of the first group of relevant content items is adjusted in accordance with user feedback. Generally, user feedback provides an implicit or explicit indication of whether a user is interested in a content item and/or agrees that the content item is relevant. In some implementations, implicit user feedback includes an interaction frequency with respect to a content item of the identified first group, automatically measured and determined after the first group has been identified and/or links to the first group are sent. For example, an implicit indication of whether a user is interested in the content item and/or agrees that the content item is relevant is based on the frequency with which, and/or the duration for which, a user interacts with the content item after the first group is identified and links are sent (e.g., the number of times the content item is viewed, how long the content item is viewed, etc.). In some implementations, explicit user feedback includes a user input indicating an interest or lack of interest in, and/or a relevance or irrelevance of, a content item of the identified first group. For example, the user selects a user-interface element indicating interest or a lack of interest, performs a swipe gesture with touch input 420-3 (FIG. 4B) to indicate a lack of interest, performs another gesture, or configures relevance settings of the social-networking application.

Figure 5D:
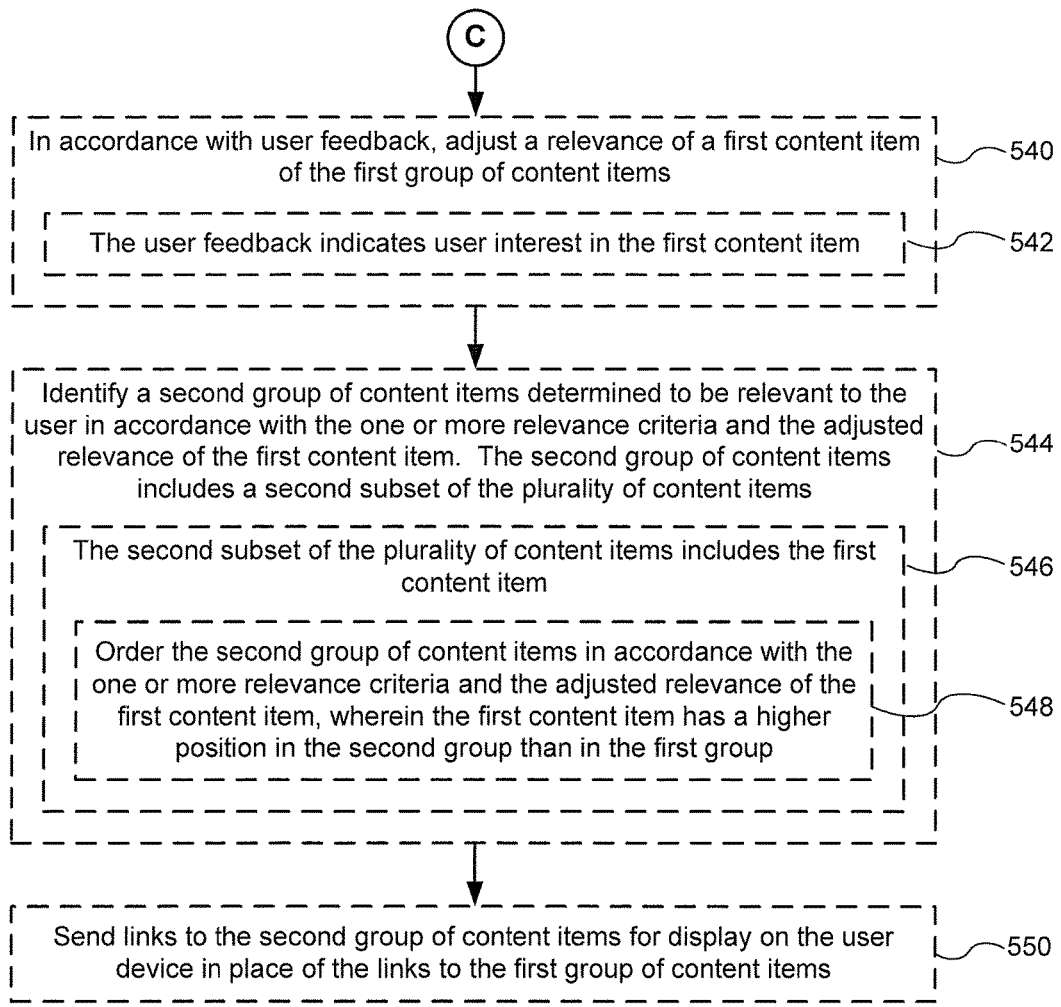

Referring now to FIG. 5D, in some embodiments, a relevance of a first content item of the first group of relevant content items is adjusted (540) in accordance with user feedback indicating user interest (542) in the first content item.

A second group of content items determined to be relevant to the user is identified (544) in accordance with the one or more relevance criteria and the adjusted relevance of the first content item. The second group of content items includes a second subset of the plurality of content items. Because the user feedback indicated user interest in the first content item, the second subset of the plurality of content items includes (546) the first content item. Optionally, the second group of content items is ordered (548) in accordance with the one or more relevance criteria and the adjusted relevance of the first content item, wherein the first content item has a higher position in the second group than in the first group.

Thus, for example, if a user provides user feedback indicating an interest in a content item of the identified first group of relevant content items, a second group of relevant content items is identified, which includes the content item that the user indicated an interest in at a position higher than its previous position in the first group. Accordingly, the social-networking service is able to better identify and display a group of relevant content items by considering user feedback.

After identifying (544) the second group of content items determined to be relevant to the user, links to the second group of content items are sent (550) for display on the user device in place of the links to the first group of content items.

Figure 5E:
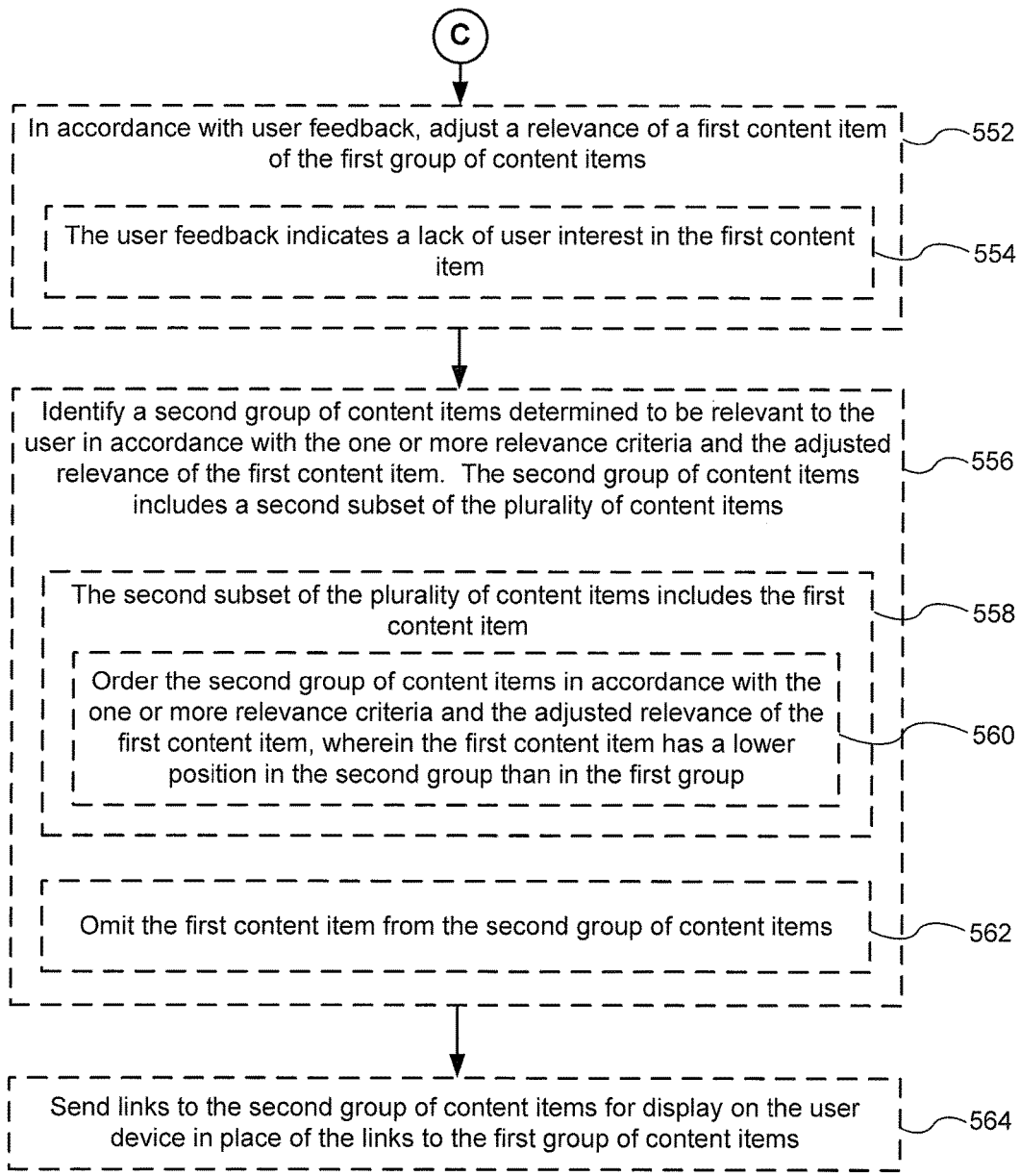

Referring now to FIG. 5E, in other embodiments, a relevance of a first content item of the first group of relevant content items is adjusted (552) in accordance with user feedback indicating a lack of user interest (554) in the first content item. A second group of content items determined to be relevant to the user is identified (556) in accordance with the one or more relevance criteria and the adjusted relevance of the first content item. The second group of content items includes a second subset of the plurality of content items.

In some implementations, the second subset of the plurality of content items includes (558) the first content item. Optionally, the second group of content items is ordered (560) in accordance with the one or more relevance criteria and the adjusted relevance of the first content item, wherein the first content item has a lower position in the second group than in the first group.

Thus, for example, if a user provides user feedback indicating a lack of interest in a content item of the identified first group of relevant content items (e.g., swipe gesture 420-3 indicating lack of user interest, FIG. 4B), a second group of relevant content items is identified, which includes the content item that the user indicated a lack of interest in, but at a lower position than its previous position in the first group.

Alternatively, in some implementations, the first content item is omitted (562) from the second group of content items (i.e., the content item which the user indicated a lack of interest in is not included in a subsequent group of relevant content items).

After identifying (556) the second group of content items determined to be relevant to the user, links to the second group of content items are sent (564) for display on the user device in place of the links to the first group of content items.

In some embodiments, a second request for access to content items is received from the user device after receipt of the user feedback. In some implementations, identifying the second group of content items determined to be relevant to the user (operation 544 or 556) is performed in response to the second request. Furthermore, in some implementations, sending the links to the second group of content items for display on the user device (operation 550 or 564) is performed in response to the second request. Links to the plurality of content categories may also be sent in response to the second request. Alternatively, in some embodiments, the second request is triggered by the user feedback. Various other examples of triggering the second request are described above with respect to the first request (e.g., selecting "More" button 402-5, launching/executing the social-networking application, selecting a refresh button, etc.).

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. Furthermore, in some embodiments, some stages may be performed in parallel and/or simultaneously with other stages (e.g., operations 503 in FIG. 5A and 536 in FIG. 5C may be performed together). While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
   at a server system with one or more processors and memory storing instructions for execution by the one or more processors:
   receiving a first request for access to content items from a user device associated with a user;
   in response to the first request, sending links to a plurality of content categories for display on the user device, wherein the content categories comprise a plurality of content items, and wherein in response to a selection of a link to one of the content categories, the plurality of content items comprising the one of the content categories is sent for display on the user device;
   identifying a first group of content items determined to be relevant to the user in accordance with one or more relevance criteria, wherein the first group of content items comprises a first subset of the plurality of content items,
   wherein identifying the first group of content items comprises determining, for a respective content item of the plurality of content items, a respective relevance score based on one or more relevance criteria;
   in response to the first request, sending links to the first group of content items for display on the user device in addition to the links to the plurality of content categories,
   in accordance with user feedback from the user, adjusting a relevance score of a first content item of the first group of content items;
   identifying a second group of content items determined to be relevant to the user in accordance with the one or more relevance criteria and the adjusted relevance score of the first content item, wherein the second group of content items comprises a second subset of the plurality of content items; and
   sending links to the second group of content items for display on the user device in place of the links to the first group of content items.

2. The method of claim 1, wherein respective content categories of the plurality of content categories are selected from the group consisting of social-media groups, social-media pages, social-media events, social-media applications, and social-media feeds.

3. The method of claim 1, wherein the one or more relevance criteria comprise at least one of:
   a temporal proximity of the respective content item to the first request;
   a role of the user with respect to the respective content item; and an interaction frequency of the user with the respective content item.

4. The method of claim 3, wherein:
determining the respective relevance score comprises determining at least one of:
a temporal score based on the temporal proximity of the respective content item to the first request;
a role score based on the role of the user with respect to the respective content item; and
an interaction score based on the interaction frequency of the user with respect to the respective content item.

5. The method of claim 4, wherein each content item of the first subset of the plurality of content items has a respective relevance score satisfying a relevance threshold.

6. The method of claim 4, further comprising ordering the first group of content items based on the respective relevance scores of the first subset of the plurality of content items.

7. The method according to claim 3, wherein:
the user feedback indicates user interest in the first content item;
the second subset of the plurality of content items comprises the first content item; and
the method further comprises ordering the second group of content items in accordance with the one or more relevance criteria and the adjusted relevance score of the first content item, wherein the first content item has a higher position in the second group than in the first group.

8. The method according to claim 3, wherein:
the user feedback indicates a lack of user interest in the first content item;
the second subset of the plurality of content items comprises the first content item; and
the method further comprises ordering the second group of content items in accordance with the one or more relevance criteria and the adjusted relevance score of the first content item, wherein the first content item has a lower position in the second group than in the first group.

9. The method according to claim 1, wherein the user feedback indicates a lack of user interest in the first content item, the method further comprising omitting the first content item from the second group of content items.

10. The method according to claim 1, further comprising:
receiving a second request for access to content items from the user device after receipt of the user feedback; and
in response to the second request, sending the links to the plurality of content categories for display on the user device;
wherein sending the links to the second group of content items for display on the user device in place of the links to the first group of content items is performed in response to the second request, in addition to sending the links to the plurality of content categories for display on the user device.

11. The method of claim 1, wherein identifying the first group of content items comprises identifying an upcoming event with an event time within a specified time period with respect to a time of the first request.

12. The method of claim 1, wherein identifying the first group of content items comprises identifying an upcoming event, of a plurality of upcoming events, with an event time closest to a time of the first request.

13. The method of claim 1, wherein identifying the first group of content items comprises identifying a social-media page that the user administers.

14. The method of claim 1, wherein identifying the first group of content items comprises identifying a content item, of the plurality of content items, for which the user has satisfied a threshold number of interactions.

15. The method of claim 1, wherein:
sending the links to the plurality of content categories comprises providing the links to the plurality of content categories for display in a first section of a graphical user interface shown; and
sending the links to the first group of content items comprises providing the links to the first group of content items for display in a second section of the graphical user interface.

16. The method of claim 1, wherein the number of content items in the first group of content items is based on at least one of:
an activity level of the user; and
a type of the user device.

17. The method of claim 1, wherein at least one content item is included in both the plurality of content items and the first group of content items, and is sent as a link for display on the user device as part of both the plurality of content items and the first group of content items.

18. A server system, comprising:
one or more processors; and
memory storing one or more programs for execution by the one or more processors, the one or more programs including instructions for:
in response to a first request for access to content items from a user device associated with a user, sending links to a plurality of content categories for display on the user device, wherein the content categories comprise a plurality of content items, and wherein in response to a selection of a link to one of the content categories, the plurality of content items comprising the one of the content categories is to be sent for display on the user device;
identifying a first group of content items determined to be relevant to the user in accordance with one or more relevance criteria, wherein the first group of content items comprises a first subset of the plurality of content items,
wherein identifying the first group of content items comprises determining, for a respective content item of the plurality of content items, a respective relevance score based on one or more relevance criteria;
in response to the first request, sending links to the first group of content items for display on the user device in addition to the links to the plurality of content categories;
in accordance with user feedback from the user, adjusting a relevance score of a first content item of the first group of content items;
identifying a second group of content items determined to be relevant to the user in accordance with the one or more relevance criteria and the adjusted relevance score of the first content item, wherein the second group of content items comprises a second subset of the plurality of content items; and
sending links to the second group of content items for display on the user device in place of the links to the first group of content items.

19. The server system of claim 18, wherein the one or more relevance criteria comprise at least one of:
   a temporal proximity of the respective content item to the first request;
   a role of the user with respect to the respective content item; and
   an interaction frequency of the user with the respective content item.

20. A non-transitory computer-readable storage medium, storing one or more programs for execution by one or more processors, the one or more programs including instructions for:
   in response to a first request for access to content items from a user device associated with a user, sending links to a plurality of content categories for display on the user device, wherein the content categories comprise a plurality of content items, and wherein in response to a selection of a link to one of the content categories, the plurality of content items comprising the one of the content categories is to be sent for display on the user device;
   identifying a first group of content items determined to be relevant to the user in accordance with one or more relevance criteria, wherein the first group of content items comprises a first subset of the plurality of content items,
   wherein identifying the first group of content items comprises determining, for a respective content item of the plurality of content items, a respective relevance score based on one or more relevance criteria;
   in response to the first request, sending links to the first group of content items for display on the user device in addition to the links to the plurality of content categories;
   in accordance with user feedback from the user, adjusting a relevance score of a first content item of the first group of content items;
   identifying a second group of content items determined to be relevant to the user in accordance with the one or more relevance criteria and the adjusted relevance score of the first content item, wherein the second group of content items comprises a second subset of the plurality of content items; and
   sending links to the second group of content items for display on the user device in place of the links to the first group of content items.

* * * * *